(12) United States Patent
Gumeci et al.

(10) Patent No.: US 11,417,891 B2
(45) Date of Patent: Aug. 16, 2022

(54) CATHODE INCLUDING A TANDEM ELECTROCATALYST AND SOLID OXIDE FUEL CELL INCLUDING THE SAME

(71) Applicant: Nissan North America, Inc., Franklin, TN (US)

(72) Inventors: Cenk Gumeci, Northville, MI (US); Mohammed Hussain Abdul Jabbar, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 163 days.

(21) Appl. No.: 16/549,848

(22) Filed: Aug. 23, 2019

(65) Prior Publication Data
US 2021/0057770 A1 Feb. 25, 2021

(51) Int. Cl.
*H01M 4/88* (2006.01)
*H01M 8/1246* (2016.01)
(Continued)

(52) U.S. Cl.
CPC ....... *H01M 4/8885* (2013.01); *H01M 4/8626* (2013.01); *H01M 4/8652* (2013.01); *H01M 4/8657* (2013.01); *H01M 4/8668* (2013.01); *H01M 4/8673* (2013.01); *H01M 4/8825* (2013.01); *H01M 4/8889* (2013.01); *H01M 8/126* (2013.01); *H01M 8/1226* (2013.01); *H01M 8/1246* (2013.01);
(Continued)

(58) Field of Classification Search
CPC ............. H01M 4/8885; H01M 4/8626; H01M 4/8652; H01M 4/8657; H01M 4/8668; H01M 4/8673; H01M 4/8825; H01M 4/8889; H01M 12/1226; H01M 12/1246; H01M 12/1254; H01M 12/126; H01M 2004/8689
See application file for complete search history.

(56) References Cited

U.S. PATENT DOCUMENTS

| | | | |
|---|---|---|---|
| 3,522,097 A * | 7/1970 | Tedmon, Jr. | ........ H01M 8/0232 429/489 |
| 5,543,239 A | 8/1996 | Virkar et al. | |

(Continued)

FOREIGN PATENT DOCUMENTS

| | | | |
|---|---|---|---|
| CN | 1979938 A | | 6/2007 |
| CN | 103515633 A * | | 1/2014 |

(Continued)

OTHER PUBLICATIONS www.espacenet.com machine translation of the detailed description of JP 03-237014A (Year: 1991).*

(Continued)

*Primary Examiner* — Gregg Cantelmo
(74) *Attorney, Agent, or Firm* — Global IP Counselors, LLP

(57) ABSTRACT

A cathode having a tandem electrocatalyst structure is provided. The cathode includes a plurality of wires spaced apart from each other, a layer formed on a surface of each of the plurality of wires, and a plurality of nanoparticles disposed on the layer. Each of the plurality of wires includes a first perovskite material or a metal. The layer includes a second perovskite material. Each of the nanoparticles includes a metal oxide.

30 Claims, 5 Drawing Sheets

(51) Int. Cl.
*H01M 4/86* (2006.01)
*H01M 8/1226* (2016.01)
*H01M 8/1253* (2016.01)
*H01M 8/126* (2016.01)

(52) U.S. Cl.
CPC .. *H01M 8/1253* (2013.01); *H01M 2004/8684* (2013.01); *H01M 2004/8689* (2013.01)

(56) References Cited

U.S. PATENT DOCUMENTS

| | | |
|---|---|---|
| 6,420,064 B1 | 7/2002 | Ghosh et al. |
| 7,534,519 B2 | 5/2009 | Cable et al. |
| 2007/0134539 A1 | 6/2007 | Chung et al. |
| 2007/0141447 A1* | 6/2007 | Crumm ............... H01M 8/2483 429/444 |
| 2008/0193803 A1 | 8/2008 | Sholklapper et al. |
| 2009/0136806 A1* | 5/2009 | Imanishi ........... H01M 8/04074 429/410 |
| 2010/0038012 A1 | 2/2010 | Tucker et al. |
| 2012/0077095 A1* | 3/2012 | Roumi ................... H01M 4/04 429/405 |
| 2012/0251917 A1 | 10/2012 | Son et al. |
| 2019/0140287 A1 | 5/2019 | Liu et al. |

FOREIGN PATENT DOCUMENTS

| | | |
|---|---|---|
| EP | 2056985 A2 | 5/2009 |
| JP | 03237014 A * | 10/1991 |
| JP | 2019517098 A | 6/2019 |
| KR | 100863315 B1 * | 10/2008 |

OTHER PUBLICATIONS

Google Patents website (www.patents.google.com) machine translation of KR 10-086315. (Year: 2008).*

* cited by examiner

CATHODE INCLUDING A TANDEM ELECTROCATALYST AND SOLID OXIDE FUEL CELL INCLUDING THE SAME

BACKGROUND

Field of the Invention

The present invention generally relates to a cathode for a solid oxide fuel cell. More specifically, the present invention relates to a cathode having a tandem electrocatalyst structure in which a plurality of wires are each spaced apart from each other, a layer is formed on a surface of each of the plurality of wires, and a plurality of nanoparticles are disposed on the layer. Each of the plurality of wires comprises a first perovskite material or a metal. The layer includes a second perovskite material, and each of the plurality of nanoparticles includes a metal oxide.

Background Information

Solid oxide fuel cells ("SOFCs") produce electricity by directly oxidizing a fuel. SOFCs use a solid oxide electrolyte to conduct oxygen ions from the cathode to the anode. The solid electrolyte is formed of a material that conducts only oxygen ions and blocking electrons. The cathode is an electrically conductive material that must be compatible with the oxygen ion conductive solid electrolyte with required electrocatalytic activity for oxygen reduction reaction. Cathode materials that are both electrically and ionically conductive are preferable for use in SOFCs.

Conventional SOFC cathodes are limited by the lack of electrochemical activity of the material, increasing the overall impedance of the cell. For automotive applications, a high volumetric power density is required. However, the power density is limited by the poor catalytic performance of conventional SOFC cathodes with respect to the oxygen reduction reaction. Therefore, there is a need for a cathode with an improved performance in the oxygen reduction reaction.

SUMMARY

It has been discovered that in order to improve the power density of the SOFC, an improved catalyst performance in the cathode is needed.

In particular, it has been discovered that a cathode with a tandem electrocatalyst structure shows a synergetic improvement in the catalytic performance of the oxygen reduction reaction. Therefore, it is desirable to provide a cathode having a tandem electrocatalyst structure in which a plurality of wires are spaced apart from each other and a layer is formed on the surface of the wires.

In view of the state of the known technology, one aspect of the present disclosure is to provide a cathode. The cathode includes a plurality of wires spaced apart from each other, a layer formed on a surface of each of the plurality of wires, and a plurality of nanoparticles disposed on the layer. Each of the plurality of wires is formed of a first perovskite material. The layer includes a second perovskite material, and each of the plurality of nanoparticles includes a metal oxide.

Another aspect of the present disclosure is to provide a solid oxide fuel cell having an improved cathode. The solid oxide fuel cell includes a solid electrolyte, a plurality of wires spaced apart from each other on the solid electrolyte layer, a layer formed on a surface of each of the plurality of wires, and a plurality of nanoparticles disposed on the layer. Each of the plurality of wires includes a first perovskite material or a metal. The layer includes a second perovskite material. Each of the plurality of nanoparticles includes a metal oxide.

An aspect of the present disclosure is also to provide a cathode including a plurality of wires spaced apart from each other, and a layer formed on a surface of each of the plurality of wires. Each of the plurality of wires is formed of a metal, and the layer comprises a metal oxide.

Another aspect of the present disclosure is to provide a method of producing a solid oxide

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
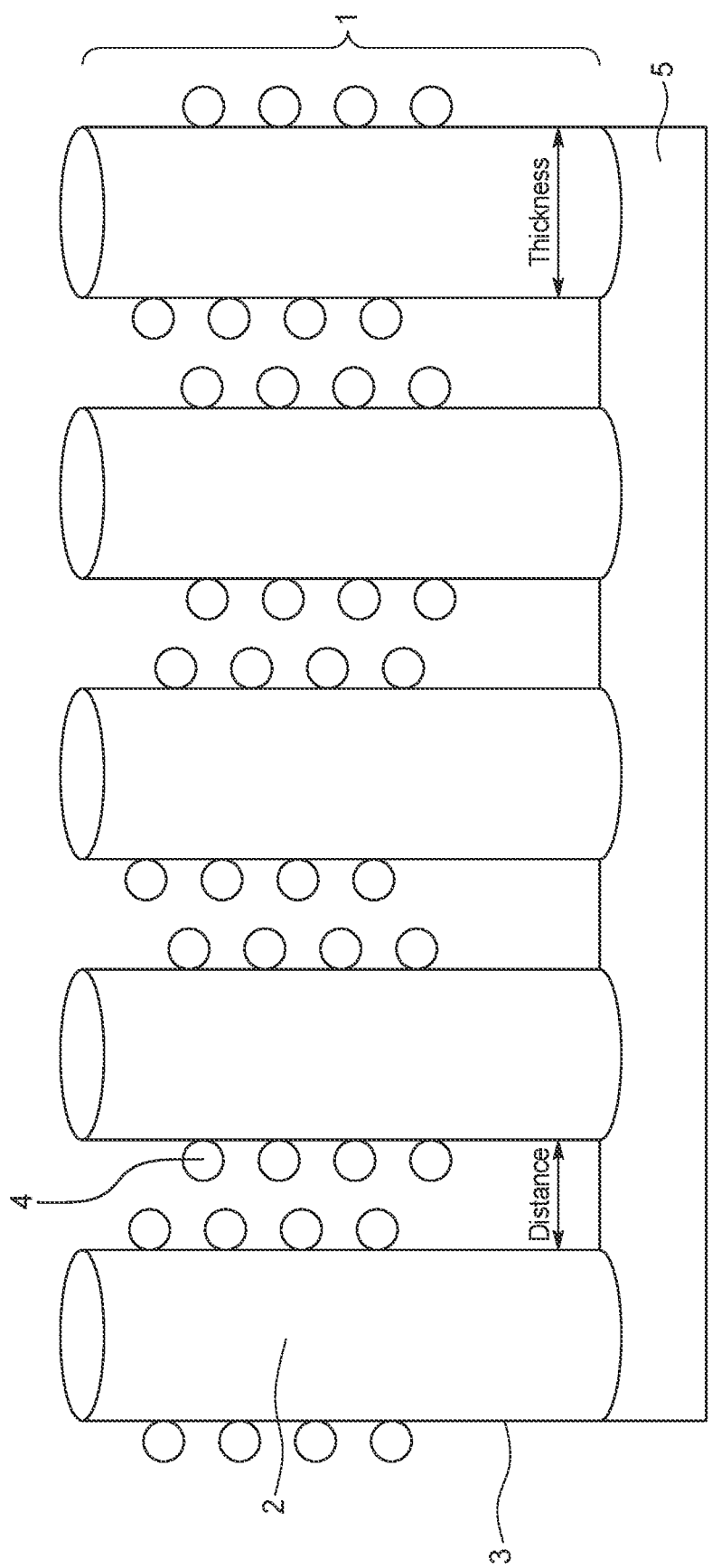
FIG. 1 is a schematic view of a cathode according to one embodiment.

Referring initially to FIG. 1, a cathode 1 is illustrated that includes a plurality of wires 2, a layer 3 formed on a surface of each of the wires 2, and a plurality of nanoparticles 4 provided on the layer 3 in accordance with a first embodiment. The cathode 1 is formed on a solid electrolyte 5. The cathode 1 and solid electrolyte 5 can be incorporated in a solid oxide fuel cell.

The cathode 1 has a tandem electrocatalyst structure that includes the plurality of wires 2, the layer 3 and the nanoparticles 4. The cathode has an overall thickness of approximately 200 μm.

The plurality of wires 2 are spaced apart from each other on the solid electrolyte 5 by a certain distance in order to allow oxygen or air to more easily penetrate the cathode and interact with the catalyst materials. Therefore, by spacing the wires 2 apart from each other, the gas-catalyst interaction and overall cathode performance can beneficially be improved. The distance between each of the wires 2 can be constant or variable and preferably ranges from approximately 100 nm to 10 μm. The plurality of wires 2 spaced apart from each other form the backbone in the tandem electrocatalyst structure. FIG. 1 shows four wires 2 provided on the surface of the solid electrolyte 5. However, it should be understood that the plurality of wires 2 may include any suitable number of wires 2.

The wires 2 are compressible and can be formed of a perovskite material. For example, the wires 2 can be formed of lanthanum strontium manganite ("LSM") having the formula $(La_{0.8}Sr_{0.2})_{0.95}MnO_3$, lanthanum strontium cobaltite ("LSC") having the formula $La_{0.6}Sr_{0.4}CoO_3$, samarium strontium cobaltite ("SSC") having the formula $Sr_{0.5}Sm_{0.5}CoO_3$, barium strontium cobalt ferrite ("BSCF") having the formula $Ba_{0.5}Sr_{0.5}Co_{0.8}Fe_{0.2}O_3$, lanthanum strontium cobalt ferrite ("LSCF") having the formula $(La_{0.6}Sr_{0.4})_{0.95}(Co_{0.2}Fe_{0.8})O_3$, praseodymium barium strontium iron cobaltite ("PBSCF") having the formula $PrBa_{0.5}Sr_{0.5}Co_{1.5}Fe_{0.5}O_{5+y}$), or mixtures thereof. The wires 2 may also include gallium-doped ceria ("GDC"). The wires 2 are preferably formed of LSCF.

The wires 2 each have a thickness ranging from approximately 100 nm to 10 µm. The thickness of the wires 2 can be constant or variable. The length of the wires 2 can also be constant or variable and preferably ranges from approximately 200 nm to 50 µm. The compressible wires 2 improve the mechanical robustness of the cathode 1.

The layer 3 is coated on the wires 2 such that the layer 3 acts as a shell covering all the outer surfaces of the wires 2 and the wires 2 act as a core. The layer 3 is a thin coating having a thickness of approximately 50 nm to 200 nm. The layer 3 improves the oxygen reduction activity of the catalyst. The layer 3 is porous and includes a perovskite material. The perovskite material can be selected from the perovskite materials used for the wires 2, namely LSM, LSC, SSC, BSCF, LSCF, PBSCF, and mixtures thereof. The perovskite material in the layer 3 is preferably PBSCF.

The nanoparticles 4 are disposed on all the outer surfaces of the layer 3 to improve the active sites and thereby boost the oxygen reduction activity of the electrocatalyst. The nanoparticles 4 each have a size of approximately 5 nm to 20 nm. The nanoparticles 4 can be formed of a metal oxide. The metal oxide can include a rare-earth metal. For example, the metal oxide can be praseodymium oxide ("$PrO_x$"), neodymium oxide ("$NdO_x$"), or a mixture thereof. FIG. 1 shows eight nanoparticles 4 provided on the outer surface of the layer 3. However, it should be understood that any suitable number of nanoparticles 4 may be provided on the layer 3 of each of the wires 2.

The solid electrolyte 5 can be any suitable electrolyte that conducts oxygen ions and is compatible with the tandem electrocatalyst structure. For example, the solid electrolyte 5 can be formed of yttria-stabilized zirconia ("YSZ"), scandia-yttria-stabilized zirconia ("ScYSZ"), scandia-ceria-stabilized zirconia ("ScCeSZ), doped bismuth oxide, lanthanum strontium gallium magnesium oxide ("LSGM"), or mixtures thereof. The solid electrolyte 5 preferably comprises ScYSZ.

Figure 2:
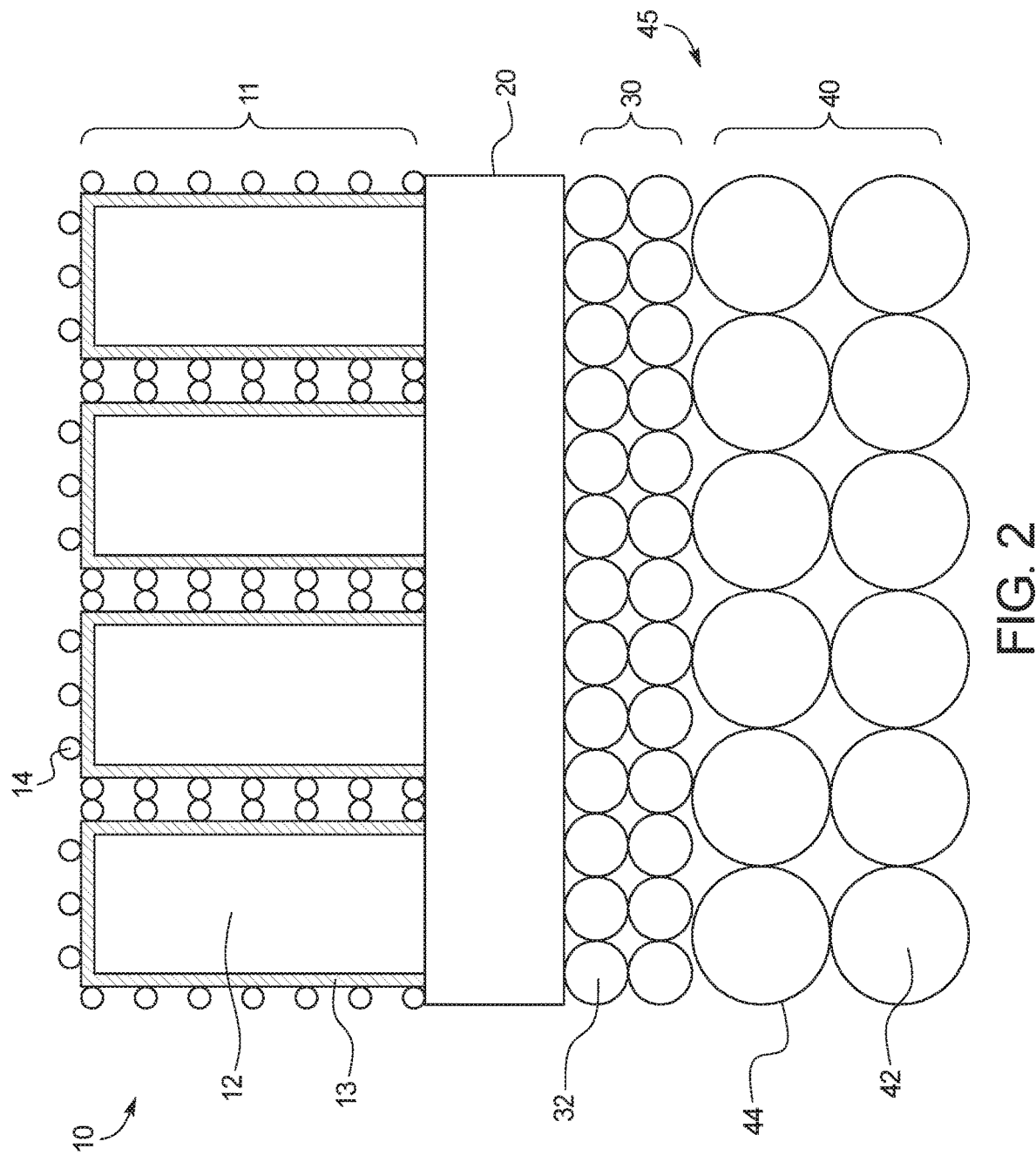
FIG. 2 is a schematic view of a solid oxide fuel cell according to an embodiment.

FIG. 2 shows a schematic view of a solid oxide fuel cell 10 in accordance with a second embodiment. The solid oxide fuel cell 10 includes a cathode 11, a solid electrolyte 20, a bonding layer 30, and a metal support 40. The bonding layer 30 and the metal support 40 together form an anode 45. The cathode 11 is disposed on a first surface of the solid electrolyte 20. The anode 45 is disposed on a second surface opposite the first surface of the solid electrolyte 20.

As shown in FIG. 2, the cathode 11 has a tandem electrocatalyst structure that includes a plurality of wires 12, a layer 13 formed on a surface of each of the wires 12, and a plurality of nanoparticles 14 provided on the layer 13. The cathode has an overall thickness of approximately 200 µm.

The plurality of wires 12 are spaced apart from each other on the solid electrolyte 20 by a certain distance in order to allow oxygen or air to more easily penetrate the cathode and interact with the catalyst materials. The distance between each of the wires 12 can be constant or variable and preferably ranges from approximately 100 nm to 10 µm.

The wires 12 are compressible and can be formed of a metal. For example, the wires 12 can be formed of stainless steel. The wires 12 each have a thickness ranging from approximately 100 nm to 10 µm. The thickness of the wires 12 can be constant or variable. The length of the wires 12 can also be constant or variable and preferably ranges from approximately 200 nm to 50 µm.

The layer 13 is coated on the wires 12 such that the layer 13 acts as a shell covering all the outer surfaces of the wires 12 and the wires 12 act as a core. The layer 13 is a thin coating having a thickness of approximately 50 nm to 200 nm. The layer 13 is porous and includes a perovskite material. The perovskite material can be LSM, LSC, SSC, BSCF, LSCF, PBSCF, or a mixture thereof. The perovskite material in the layer 13 is preferably LSC or PBS CF.

The nanoparticles 14 are disposed on all the outer surfaces of the layer 13 to improve the oxygen reduction activity of the electrocatalyst. The nanoparticles 14 each have a size of approximately 5 nm to 20 nm. The nanoparticles 14 can be formed of a metal oxide. The metal oxide can include a rare-earth metal. For example, the metal oxide can be $PrO_x$, $NdO_x$, or a mixture thereof. FIG. 2 shows seventeen nanoparticles 14 provided on the outer surfaces of the layer 13 for each of the wires 12. However, it should be understood that any suitable number of nanoparticles 14 may be provided on the layer 13 of each of the wires 12.

The solid electrolyte 20 can be any suitable electrolyte that conducts oxygen ions and is compatible with the tandem electrocatalyst structure. For example, the solid electrolyte 20 can be formed of YSZ, ScYSZ, ScCeYSZ, doped bismuth oxide, LSGM, or mixtures thereof. The solid electrolyte 20 preferably comprises ScYSZ. The solid electrolyte 20 has a thickness of approximately 5 µm to 10 µm.

As shown in FIG. 2, the anode 45 includes a bonding layer 30 disposed on a metal support 40. The bonding layer 30 includes particles 32 formed of a material that conducts oxygen ions. Each of the particles 32 has a size ranging from 1 µm to 60 µm. The overall thickness of the bonding layer is approximately 20 µm.

The particles 32 may be formed of YSZ, ScYSZ, ScCeYSZ, doped bismuth oxide, LSGM, or mixtures thereof. The particles 32 are preferably formed of ScYSZ. FIG. 2 shows twenty-six particles 32 provided in the bonding layer 30. However, it should be understood that the bonding layer 30 may include any suitable number of particles 32.

The metal support 40 comprises a plurality of metal particles 42 surrounded by an anode catalyst coating 44. The metal support 40 has an overall thickness of approximately 200 µm. The metal particles 42 are each formed of stainless steel, for example stainless steel 430. The metal particles 42 each have a size ranging from 100 µm to 150 µm. The anode catalyst coating 44 includes a cermet of a metal and a ceramic. For example, the anode catalyst coating 44 can include a cermet of nickel and yttria-stabilized zirconia ("Ni-YSZ"), a cermet of nickel and gadolinium-doped ceria ("Ni-GDC"), a cermet of nickel and samarium-doped ceria ("Ni-SDC"), a cermet of nickel and scandia-yttria-stabilized zirconia ("Ni-ScYSZ"), a perovskite material such as $SrCo_{0.2}Fe_{0.4}Mo_{0.4}O_3$, or a mixture thereof. The anode catalyst coating 44 has a thickness of approximately 10 nm to 500 nm. FIG. 2 shows twelve particles 42 provided in the metal support 40, but it should be understood that the metal support 40 may include any suitable number of particles 42.

Figure 3:
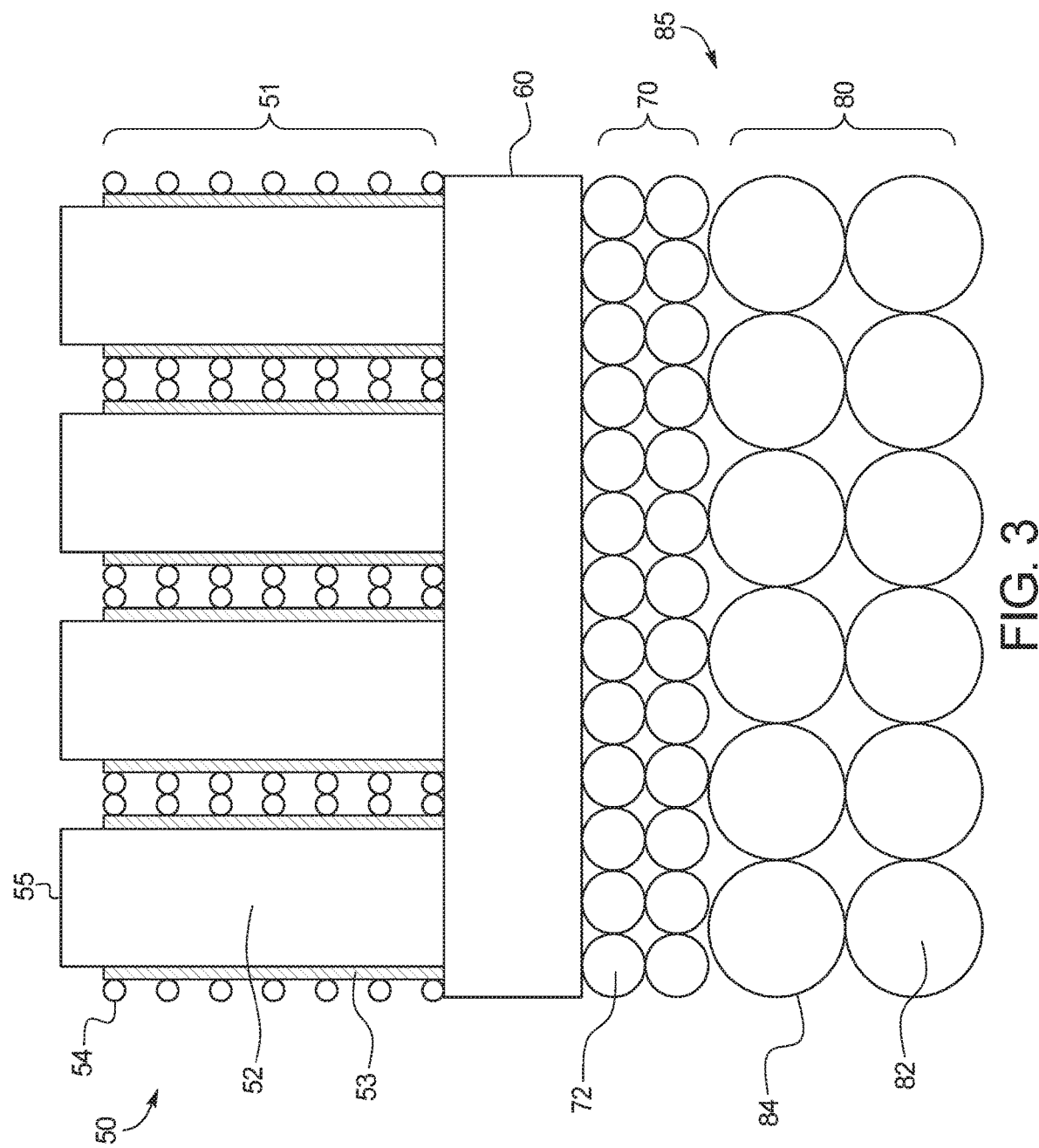
FIG. 3 is a schematic view of a solid oxide fuel cell according to an embodiment.

FIG. 3 shows a schematic view of a solid oxide fuel cell 50 in accordance with a third embodiment. The solid oxide fuel cell 50 includes a cathode 51, a solid electrolyte 60, a bonding layer 70, and a metal support 80. The bonding layer 70 and the metal support 80 together form an anode 85. The cathode 51 is disposed on a first surface of the solid electrolyte 60. The anode 85 is disposed on a second surface opposite the first surface of the solid electrolyte 60.

As shown in FIG. 3, the cathode 51 has a tandem electrocatalyst structure that includes a plurality of wires 52, a layer 53 formed on each of the wires 52, and a plurality of nanoparticles 54 provided on the layer 53. The cathode has an overall thickness of approximately 200 μm. The cathode 51 is the same as the cathode 11 in the second embodiment except that the top surface of each of the wires 52 is free from catalyst to allow for more efficient current collection. The cathode 51 will be described in further detail below.

The plurality of wires 52 are spaced apart from each other on the solid electrolyte 60 by a certain distance in order to allow oxygen or air to more easily penetrate the cathode and interact with the catalyst materials. The distance between each of the wires 52 can be constant or variable and preferably ranges from approximately 100 nm to 10 μm.

The wires 52 are compressible and can be formed of a metal. For example, the wires 52 can be formed of stainless steel. The wires 52 each have a thickness ranging from approximately 100 nm to 10 μm. The thickness of the wires 52 can be constant or variable. The length of the wires 52 can also be constant or variable and preferably ranges from approximately 200 nm to 50 μm.

The layer 53 is coated on only the side surfaces of each of the wires 52 such that the top surface 55 of each of the wires 52 is free from both the layer 53 and the nanoparticles 54. The layer 53 is a thin coating having a thickness of approximately 50 nm to 200 nm. The layer 53 is porous and includes a perovskite material. The perovskite material can be LSM, LSC, SSC, BSCF, LSCF, PBSCF, or a mixture thereof. The perovskite material in the layer 53 is preferably LSC or PBSCF.

The nanoparticles 54 are disposed on the outer surface of the layer 53 to improve the oxygen reduction activity of the electrocatalyst. Because the top surface 55 of each of the wires 52 is free from the layer 53, the nanoparticles are not formed on the top surface 55 of each of the wires 52. The nanoparticles 54 each have a size of approximately 5 nm to 20 nm. The nanoparticles 54 can be formed of a metal oxide. The metal oxide can include a rare-earth metal. For example, the metal oxide can be $PrO_x$, $NdO_x$, or a mixture thereof.

The top surface 55 of each of the wires 52 is clear from catalyst in the layer 53 or the nanoparticles 54. Instead, the top surface 55 of each of the wires 52 is coated with an epoxy layer. The epoxy layer has a thickness of approximately 1 μm to 3 μm.

The solid electrolyte 60 can be any suitable electrolyte that conducts oxygen ions and is compatible with the tandem electrocatalyst structure. For example, the solid electrolyte 60 can be formed of YSZ, ScYSZ, ScCeSZ, doped bismuth oxide, LSGM, or mixtures thereof. The solid electrolyte 60 preferably comprises ScYSZ. The solid electrolyte 60 has a thickness of approximately 5 μm to 10 μm.

As shown in FIG. 3, the anode 85 includes a bonding layer 70 disposed on a metal support 80. The bonding layer 70 includes particles 72 formed of a material that conducts oxygen ions. Each of the particles 72 has a size ranging from 1 μm to 6 μm. The overall thickness of the bonding layer is approximately 20 μm.

The particles 72 may be formed of YSZ, ScYSZ, ScCeSZ, doped bismuth oxide, LSGM, or mixtures thereof. The particles 72 are preferably formed of ScYSZ. FIG. 2 shows twenty-six particles 72 provided in the bonding layer 70. However, it should be understood that the bonding layer 70 may include any suitable number of particles 72.

The metal support 80 comprises a plurality of metal particles 82 surrounded by an anode catalyst coating 84. The metal support 80 has an overall thickness of approximately 200 μm. The metal particles 82 are each formed of stainless steel, for example stainless steel 430. The metal particles 82 each have a size ranging from 100 μm to 150 μm. The anode catalyst coating 84 includes a cermet of a metal and a ceramic. For example, the anode catalyst coating 84 can include the cermets Ni-YSZ, Ni-GDC, Ni-SDC, and Ni-ScYSZ, a perovskite material such as $SrCo_{0.2}Fe_{0.4}Mo_{0.4}O_3$, or a mixture thereof. The anode catalyst coating 84 has a thickness of approximately 10 nm to 500 nm.

Figure 4:
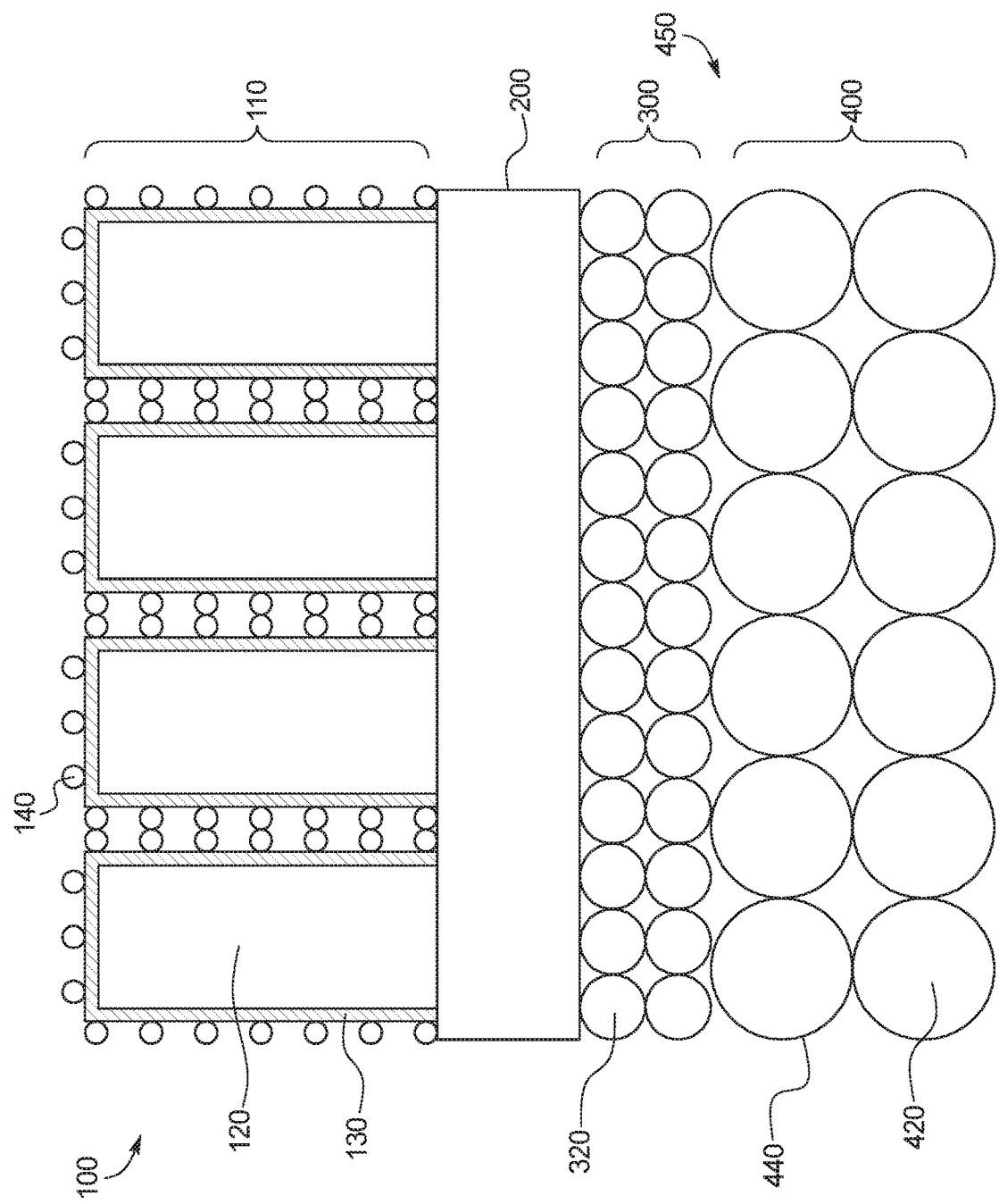
FIG. 4 is a schematic view of a solid oxide fuel cell according to an embodiment.

FIG. 4 shows a schematic view of a solid oxide fuel cell 100 in accordance with a fourth embodiment. The solid oxide fuel cell 100 includes a cathode 110, a solid electrolyte 200, a bonding layer 300, and a metal support 400. The bonding layer 300 and the metal support 400 together form an anode 450. The cathode 110 is disposed on a first surface of the solid electrolyte 200. The anode 450 is disposed on a second surface opposite the first surface of the solid electrolyte 200.

As shown in FIG. 4, the cathode 110 has a tandem electrocatalyst structure that includes a plurality of wires 120, a layer 130 formed on each of the wires 120, and a plurality of nanoparticles 140 provided on the layer 130. The cathode has an overall thickness of approximately 200 μm. The cathode 110 is the same as the cathode 11 in the second embodiment except for the layer 130. The cathode 110 will be described in further detail below.

The plurality of wires 120 are spaced apart from each other on the solid electrolyte 200 by a certain distance in order to allow oxygen or air to more easily penetrate the cathode and interact with the catalyst materials. The distance between each of the wires 120 can be constant or variable and preferably ranges from approximately 100 nm to 10 μm.

The wires 120 are compressible and can be formed of a metal. For example, the wires 120 can be formed of stainless steel. The wires 120 each have a thickness ranging from approximately 100 nm to 10 μm. The thickness of the wires 120 can be constant or variable. The length of the wires 120 can also be constant or variable and preferably ranges from approximately 200 nm to 50 μm.

The layer 130 is coated on the wires 120 such that the layer 130 acts as a shell covering all the outer surfaces of the wires 120 and the wires 120 act as a core. The layer 130 is a thin coating having a thickness of approximately 50 nm to 200 nm. The layer 130 is porous and includes a metal oxide. The metal oxide can include a transition metal. For example, the metal oxide can be chromium oxide ($CrO_x$), iron oxide ($FeO_x$), or a mixture thereof.

The nanoparticles 140 are disposed on all the outer surfaces of the layer 130 to improve the oxygen reduction activity of the electrocatalyst. The nanoparticles 140 each have a size of approximately 5 nm to 20 nm. The nanoparticles 140 can be formed of a metal oxide. The metal oxide can include a rare-earth metal. For example, the metal oxide can be $PrO_x$, $NdO_x$, or a mixture thereof. FIG. 4 shows seventeen nanoparticles 140 provided on the outer surfaces of the layer 130 for each of the wires 120. However, it should be understood that any suitable number of nanoparticles 140 may be provided on the layer 130 of each of the wires 120.

The solid electrolyte 200 can be any suitable electrolyte that conducts oxygen ions and is compatible with the tandem electrocatalyst structure. For example, the solid electrolyte 200 can be formed of YSZ, ScYSZ, ScCeSZ, doped bismuth oxide, LSGM, or mixtures thereof. The solid electrolyte 200 preferably comprises ScYSZ. The solid electrolyte 200 has a thickness of approximately 5 μm to 10 μm.

As shown in FIG. 4, the anode 450 includes a bonding layer 300 disposed on a metal support 400. The bonding layer 300 includes particles 320 formed of a material that conducts oxygen ions. Each of the particles 320 has a size ranging from 1 μm to 6 μm. The overall thickness of the bonding layer is approximately 20 μm.

The particles 320 may be formed of YSZ, ScYSZ, ScCeSZ, doped bismuth oxide, LSGM, or mixtures thereof. The particles 320 are preferably formed of ScYSZ. FIG. 4 shows twenty-six particles 320 provided in the bonding layer 300. However, it should be understood that the bonding layer 300 may include any suitable number of particles 320.

The metal support 400 comprises a plurality of metal particles 420 surrounded by an anode catalyst coating 440. The metal support 400 has an overall thickness of approximately 200 μm. The metal particles 420 are each formed of stainless steel, for example stainless steel 430. The metal particles 420 each have a size ranging from 100 μm to 150 μm. The anode catalyst coating 440 includes a cermet of a metal and a ceramic. For example, the anode catalyst coating 440 can include the cermets Ni-YSZ, Ni-GDC, Ni-SDC, or Ni-ScYSZ, a perovskite material such as $SrCo_{0.2}Fe_{0.4}Mo_{0.4}O_3$, or a mixture thereof. The anode catalyst coating 440 has a thickness of approximately 10 nm to 500 nm. FIG. 4 shows twelve particles 420 provided in the metal support 400. However, it should be understood that the metal support 400 may include any suitable number of particles 420.

Figure 5:
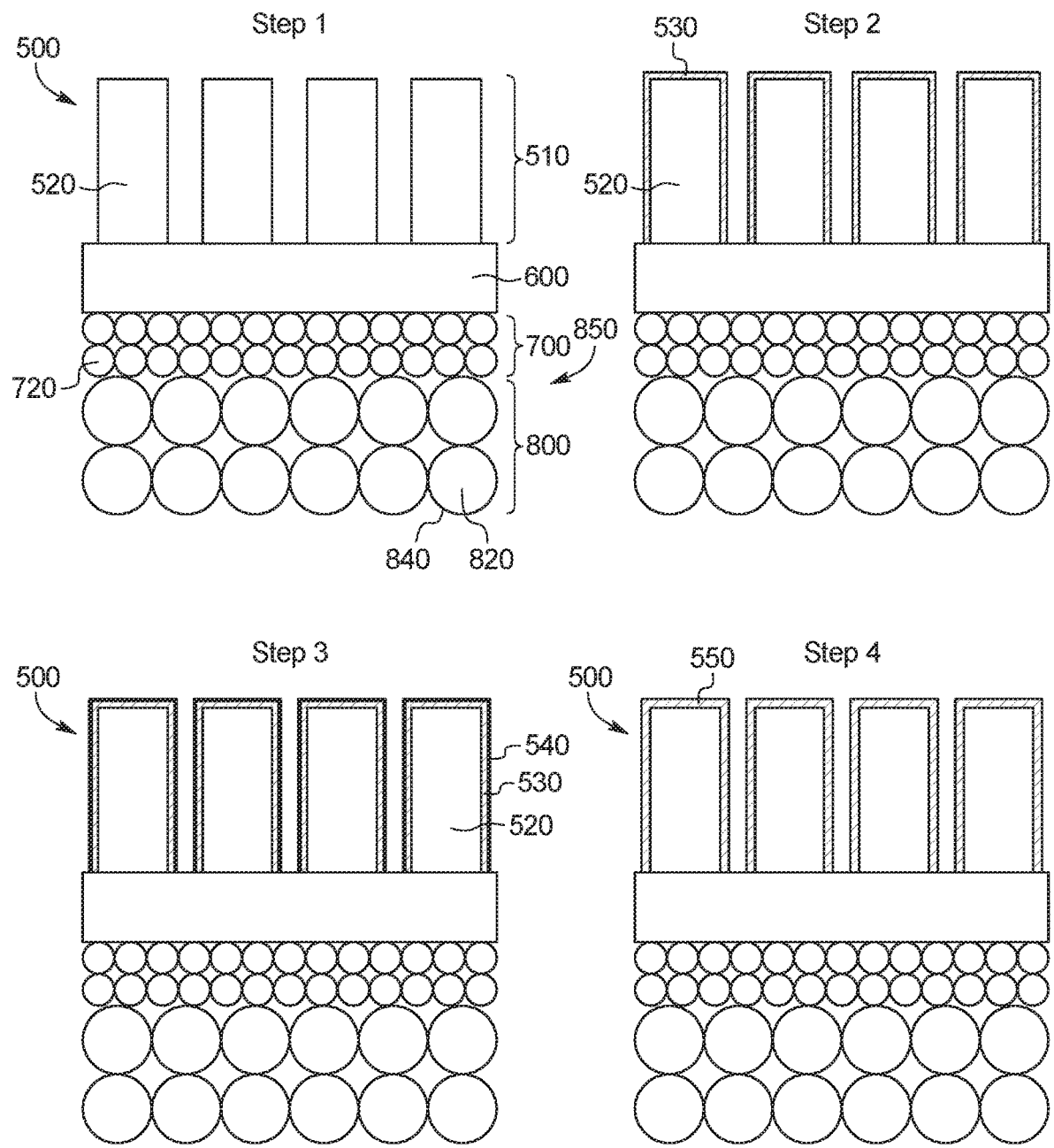
FIG. 5 is an illustrated flow chart showing a method of producing a solid oxide fuel cell according to an embodiment.

FIG. 5 illustrates a process of producing a solid oxide fuel cell 500 having a cathode 510 with a tandem electrocatalyst structure. In Step 1, the solid oxide fuel cell 500 is provided. The solid oxide fuel cell 500 includes the cathode 510, a solid electrolyte 600, a bonding layer 700, and a metal support 800. The bonding layer 700 and metal support 800 form an anode 850. The cathode 510 is disposed on a first surface of the solid electrolyte 600. The anode 850 is disposed on a second surface opposite the first surface of the solid electrolyte 600.

The cathode 510 includes a plurality of wires 520 spaced apart from each other on the solid electrolyte 600 by a certain distance in order to allow oxygen or air to more easily penetrate the cathode and interact with the catalyst materials. The distance between each of the wires 520 can be constant or variable and preferably ranges from approximately 100 nm to 10 μm. The overall thickness of the cathode 510 is approximately 200 μm.

The wires 520 are compressible and can be formed of a metal. For example, the wires 520 can be formed of stainless steel. The wires 520 each have a thickness ranging from approximately 100 nm to 10 μm. The thickness of the wires 520 can be constant or variable. The length of the wires 520 can also be constant or variable and preferably ranges from approximately 200 nm to 50 μm.

The solid electrolyte 200 can be any suitable electrolyte that conducts oxygen ions and is compatible with the tandem electrocatalyst structure of the cathode 510. For example, the solid electrolyte 200 can be formed of YSZ, ScYSZ, ScCeSZ, doped bismuth oxide, LSGM, or mixtures thereof. The solid electrolyte 200 preferably comprises ScYSZ. The solid electrolyte 200 has a thickness of approximately 5 μm to 10 μm.

The anode 850 includes a bonding layer 700 disposed on a metal support 800. The bonding layer 700 includes particles 720 formed of a material that conducts oxygen ions. Each of the particles 720 has a size ranging from 1 μm to 6 μm. The overall thickness of the bonding layer is approximately 20 μm.

The particles 720 may be formed of YSZ, ScYSZ, ScCeSZ, doped bismuth oxide, LSGM, or mixtures thereof. The particles 720 are preferably formed of ScYSZ. FIG. 5 shows twenty-six particles 720 provided in the bonding layer 700. However, it should be understood that the bonding layer 700 may include any suitable number of particles 720.

The metal support 800 comprises a plurality of metal particles 820 surrounded by an anode catalyst coating 840. The metal support 800 has an overall thickness of approximately 200 μm. The metal particles 820 are each formed of stainless steel, for example stainless steel 430. The metal particles 820 each have a size ranging from 100 μm to 150 μm. The anode catalyst coating 840 includes a cermet of a metal and a ceramic. For example, the anode catalyst coating 840 can include the cermets Ni-YSZ, Ni-GDC, Ni-SDC, or Ni-ScYSZ, a perovskite material such as $SrCo_{0.2}Fe_{0.4}Mo_{0.4}O_3$, or a mixture thereof. The anode catalyst coating 840 has a thickness of approximately 10 nm to 500 nm. FIG. 5 shows twelve particles 820 provided in the metal support 800. However, it should be understood that the metal support 800 may include any suitable number of particles 820.

In Step 2, a layer 530 is coated on all the outer surfaces of the wires 520 and the cathode 510 is sintered in air for approximately two hours until the temperature reaches 550° C. The cathode 510 is then fired in a reducing atmosphere of 2% hydrogen and argon at a temperature of 1350° C. for approximately four hours. The cathode 510 is then infiltrated at a lower temperature of up to 850° C. in air in repetitive cycles until an optimum weight is gained. The optimum weight gain after infiltration in the cathode 510 is between 5 and 20 weight percent of the overall solid oxide fuel cell 500.

The layer 530 acts as a shell covering all the outer surfaces of the wires 520 and the wires 520 act as a core. The layer 530 is a thin coating having a thickness of approximately 50 nm to 200 nm. The layer 530 is porous and includes a metal oxide. The metal oxide can include a transition metal. For example, the metal oxide can be chromium oxide ($CrO_x$), iron oxide (FeOx), or a mixture thereof. The metal oxide is preferably chromium oxide.

In Step 3, a plurality of nanoparticles 540 are disposed on all the outer surfaces of the layer 530 to improve the oxygen reduction activity of the electrocatalyst. The nanoparticles 540 each have a size of approximately 5 nm to 20 nm. The nanoparticles 540 are formed of a metal oxide. The metal oxide can include a rare-earth metal. For example, the metal oxide can be $PrO_x$, $NdO_x$, or a mixture thereof. The metal oxide is preferably $NdO_x$.

In Step 4, the cathode 510 having the tandem electrocatalyst structure of the wires 520, the layer 530 and the nanoparticles 540 is sintered in air for approximately two hours until the temperature reaches 550° C., then fired in a reducing atmosphere of 2% hydrogen and argon at a temperature of 1350° C. for approximately four hours, and finally infiltrated at a lower temperature of up to 850° C. in air. Under these conditions, the layer 530 and the nanoparticles 540 combine to form a single layer 550. The layer 550 includes a metal oxide having both a transition metal and a rare-earth metal. For example, the metal oxide includes chromium or iron, as well as neodymium or praseodymium. The metal oxide in the layer 550 is preferably neodymium chromium oxide ($NdCrO_x$).

General Interpretation of Terms

In understanding the scope of the present invention, the term "comprising" and its derivatives, such as "comprises," as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The term "configured" as used herein to describe a component, section or part of a device includes hardware and/or software that is constructed and/or programmed to carry out the desired function.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A cathode comprising:
a plurality of wires spaced apart from each other, each wire of the plurality of wires comprising a material selected from the group consisting of: a first perovskite material and a metal;
a layer formed on a surface of each wire of the plurality of wires, the layer comprising a second perovskite material; and
a plurality of nanoparticles disposed on the layer, each nanoparticle of the plurality of nanoparticles comprising a metal oxide.

2. The cathode according to claim 1, wherein
each wire of the plurality of wires is formed of at least one selected from the group consisting of: lanthanum strontium cobalt ferrite and stainless steel.

3. The cathode according to claim 1, wherein
the second perovskite material is at least one selected from the group consisting of: praseodymium barium strontium cobalt ferrite and lanthanum strontium cobaltite.

4. The cathode according to claim 1, wherein
the metal oxide is at least one selected from the group consisting of: praseodymium oxide and neodymium oxide.

5. The cathode according to claim 1, wherein
the metal oxide is at least one selected from the group consisting of: chromium oxide and iron oxide.

6. The cathode according to claim 1, wherein
each wire of the plurality of wires has a length greater than or equal to 200 nm and less than or equal to 50 µm.

7. The cathode according to claim 1, wherein
a distance between each adjacent wire of the plurality of wires is greater than or equal to 100 nm and less than or equal to 10 µm.

8. The cathode according to claim 7, wherein
the distance between each adjacent wire of the plurality of wires is constant.

9. The cathode according to claim 1, wherein
each wire of the plurality of wires has a diameter greater than or equal to 100 nm and less than or equal to 10 µm.

10. The cathode according to claim 1, wherein
a thickness of the layer is greater than or equal to 50 nm and less than or equal to 200 nm.

11. The cathode according to claim 1, wherein
each nanoparticle of the plurality of nanoparticles has a size greater than or equal to 5 nm and less than or equal to 20 nm.

12. The cathode according to claim 1, wherein
a thickness of the cathode ranges from 200 µm to 400 µm.

13. The cathode according to claim 1, wherein
a top surface of each wire of the plurality of wires is free of the layer and the nanoparticles.

14. The cathode according to claim 13, wherein
the top surface of each wire of the plurality of wires is coated with an epoxy.

15. A solid oxide fuel cell comprising:
a solid electrolyte;
a plurality of wires spaced apart from each other and formed on the solid electrolyte layer, each wire of the plurality of wires comprising a material selected from the group consisting of: a first perovskite material and a metal;
a layer formed on a surface of each wire of the plurality of wires, the layer comprising a second perovskite material or a first metal oxide; and
a plurality of nanoparticles disposed on the layer, each nanoparticle of the plurality of nanoparticles comprising a second metal oxide.

16. The solid oxide fuel cell according to claim 15, wherein
each wire of the plurality of wires is formed of at least one selected from the group consisting of: lanthanum strontium cobalt ferrite and stainless steel.

17. The solid oxide fuel cell according to claim 15, wherein
the second perovskite material is at least one selected from the group consisting of: praseodymium barium strontium cobalt ferrite and lanthanum strontium cobaltite.

18. The solid oxide fuel cell according to claim 15, wherein
the first metal oxide is at least one selected from the group consisting of: chromium oxide and iron oxide, and the second metal oxide is at least one selected from the group consisting of: praseodymium oxide and neodymium oxide.

19. The solid oxide fuel cell according to claim 15, further comprising
an anode comprising stainless steel.

20. The solid oxide fuel cell according to claim 19, further comprising
a bonding layer between the anode and the solid electrolyte,
the bonding layer comprising scandium cerium-stabilized zirconia.

21. The solid oxide fuel cell according to claim 19, wherein
the anode comprises stainless steel particles and an anode catalyst coating on each particle of the stainless steel particles.

22. The solid oxide fuel cell according to claim 15, wherein
the solid oxide fuel cell does not include a current collector.

23. The solid oxide fuel cell according to claim 15, wherein
the anode has a thickness of 200 μm.

24. The solid oxide fuel cell according to claim 15, wherein
the solid electrolyte comprises scandium cerium-stabilized zirconia.

25. A solid oxide fuel cell comprising:
a solid electrolyte;
a plurality of wires spaced apart from each other and formed on a surface of the solid electrolyte, each wire of the plurality of wires formed of stainless steel; and
a layer formed on a surface of each wire of the plurality of wires, the layer comprising a metal oxide including at least one of chromium and iron and at least one of neodymium and praseodymium,
each wire of the plurality of wires having a thickness ranging from approximately 100 nm to 10 μm.

26. The solid oxide fuel cell according to claim 25, wherein
the metal oxide is neodymium chromium oxide.

27. A method of producing a solid oxide fuel cell, the method comprising:
providing a cathode comprising a plurality of metal wires spaced apart from each other on a first surface of a solid electrolyte, the second surface of the solid electrolyte opposite the first surface being in contact with an anode;
forming a layer comprising a metal on a surface of each metal wire of the plurality of metal wires;
heating the layer in air to a first temperature to form a first metal oxide in the layer;
coating the layer with a plurality of nanoparticles; and
heating the nanoparticles in air to a second temperature to form a second metal oxide in the layer.

28. The method according to claim 27, wherein
each metal wire of the plurality of metal wires is formed of stainless steel.

29. The method according to claim 27, wherein
the anode comprises a metal support and a bonding layer formed on the metal support, the bonding layer comprising a solid electrolyte material.

30. The method according to claim 27, wherein
the second metal oxide comprises neodymium and chromium.

* * * * *